United States Patent [19]

Cheng

[11] Patent Number: 5,051,883
[45] Date of Patent: Sep. 24, 1991

[54] METHOD AND AN APPARATUS FOR FULL WAVE RECTIFICATION OF A THREE-PHASE SIGNAL OPERATING IN A WYE CONFIGURATION

[76] Inventor: Chin Y. Cheng, 10451 Scenic Cir., Cupertino, Calif. 95014

[21] Appl. No.: 557,908

[22] Filed: Jul. 25, 1990

[51] Int. Cl.⁵ .......................................... H02M 7/145
[52] U.S. Cl. ........................................ 363/89; 363/87; 363/129
[58] Field of Search ...................... 363/85, 87, 88, 89, 363/126–129; 323/299

[56] References Cited

U.S. PATENT DOCUMENTS

| | | | |
|---|---|---|---|
| 4,156,896 | 5/1979 | Weiss | 363/87 |
| 4,309,749 | 1/1982 | Weibelzahl et al. | 363/87 |
| 4,672,526 | 6/1987 | Mehnert et al. | 363/87 X |
| 4,924,371 | 5/1990 | Peterson | 363/89 |

Primary Examiner—Steven L. Stephan
Assistant Examiner—Emanuel Todd Voeltz
Attorney, Agent, or Firm—Limbach, Limbach & Sutton

[57] ABSTRACT

A full wave rectification circuit for use with a three-phase input signal connected in a wye configuration for rectifying a line to neutral high input voltage is disclosed. The rectification circuit has two portions. A first portion generates a control signal which oscillates every 60° and is switched in phase with one of the input signals. A second control signal, also oscillating in 60°, but completely out of phase with respect to the first oscillating signal is also generated. The two oscillating signals are used in a SCR switch configuration to switch the rectification circuit every 60° thereby rectifying the peak voltage portion of each phase.

9 Claims, 4 Drawing Sheets

METHOD AND AN APPARATUS FOR FULL WAVE RECTIFICATION OF A THREE-PHASE SIGNAL OPERATING IN A WYE CONFIGURATION

TECHNICAL FIELD

The present invention relates to a method and an apparatus for converting AC signal to a DC signal for a three-phase signal operating in a wye configuration. More particularly, the present invention can be used to convert the high voltages of a three-phase signal, such as 380 V(RMS) typically found in the European countries, without the need for a transformer.

BACKGROUND OF THE INVENTION

The rectification of a multi-phase alternating current signal into a DC current signal is well known in the art. In U.S. Pat. No. 3,284,690, there is disclosed a half cycle rectifying apparatus for rectifying a multi-phase signal. Thus, the SCRS 20 and 22 (in FIG. 1 thereof) and SCRS 52, 54 and 56 (in FIG. 2 thereof) permit half cycle rectification.

In U.S. Pat. No. 3,434,032, there is disclosed a full wave rectifying apparatus for rectifying a multi-phase signal alternating between peak-to-peak. However, the neutral signal is not used in the rectification process. Thus, the apparatus rectifies a multi-phase signal connected in a delta configuration.

In U.S. Pat. No. 4,667,282, a three-phase full wave rectifier is disclosed in FIG. 1 thereof. As disclosed in that reference (see for example, Col. 4, lines 13-26), the apparatus operates as a full wave rectifier for a low input voltage and a half wave rectifier when the input voltage is high.

Heretofore, because of the different voltage standards in different parts of the world, a manufacturer of electrical equipment that requires DC power has attempted to manufacture a universal (adaptable in many countries) power rectifier by providing for a transformer. Thus, in the countries where the voltage of the alternating current signal is high, the transformer would lower the signal to an acceptable low value where a conventional full wave rectifier can be used thereon.

Thus, it is desired as one of the objects of the present invention, to provide a universal (adaptable in many countries, especially those countries employing high voltage alternating current signal) full wave power rectifier without the need for a transformer.

Other references which may be of relevant to this application include U.S. Pat. No. 4,184,075; 4,433,368; 4,495,557; 4,654,538; and 4,665,323.

SUMMARY OF THE INVENTION

In the present invention, a full wave rectifier for use with a multi-phase signal with each phase being an alternating current signal with respect to a neutral comprises means for receiving the neutral and each of the multi-phase signals. The full wave rectifier circuit also comprises a control circuit that generates a first control signal and a second control signal. The first control signal oscillates between a first voltage and a second voltage. The second control signal also oscillates between the first voltage and the second voltage, but is out of phase with respect to the first control signal. The rectification of each phase of the multi-phase signal is based upon the first control signal and the second control signal.

DETAILED DESCRIPTION OF THE DRAWINGS

Figure 1:
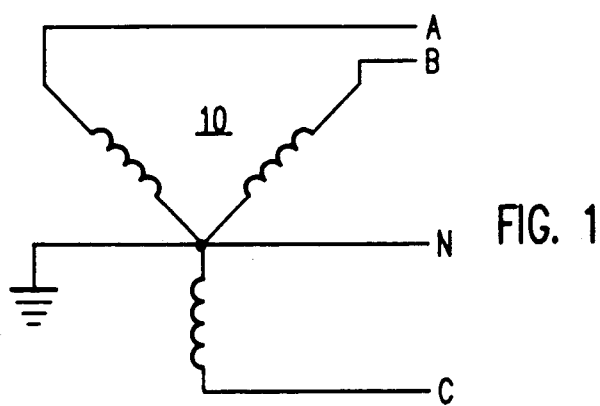
FIG. 1 is a schematic diagram showing the source of a three phase alternating signal in a wye connection including a neutral.

Referring to FIG. 1, there is shown a source 10 for providing a three-phase signal (A, B, C) which is wye connected and includes a neutral, designated N. The three signals, A, B and C and the neutral N provide an alternating current signal and are used by the apparatus of the present invention to provide a full wave rectification. Each of the three phases A, B, C is an alternating current signal with respect to the neutral and is substantially 120° out of phase with another. A typical wave form is shown in FIG. 5(a).

The voltage phase signals A, B and C are used to generate the control signals used in the apparatus of the present invention.

Referring to FIG. 2(a), there is shown a first control circuit 20 which receives one of the voltage phase signal. For convenience, the voltage phase signal A has been chosen. The signal A and the neutral N are supplied to the circuit 20 comprising of a resistor $R_1$, diode $CR_1$ and resistor $R_2$ connected in series. Since there is only one diode, the signal is rectified in a half cycle. U1 is an operational amplifier. U5 is a voltage comparator and serves to buffer the output of the half wave rectified signal. The output of the first control circuit 20 at the node S will have a wave form shown in FIG. 5(c). As can be seen from FIG. 5(c), the signal S is a digital signal that is substantially zero during the positive phase of the A cycle and has a positive voltage during the negative half cycle of the A phase. Thus, the S signal is switched in phase with the A phase of the three-phase signal. The amplitude of the signal S is determined by the voltage reference connected to U5 and resistor R7. In the preferred embodiment, this voltage is +12 volts. Twelve volts is preferred as this is the voltage used in most CMOS digital circuits and analog circuits, U1 and U5.

FIG. 2(b) is a second control circuit 22 which receives the reduced voltage phase signals A, B and C and the neutral N. The second control circuit 22 comprises three substantially identical portions 24, 26 and 28. The first portion 24 receives one of the voltage phase signal, such as A. The second portion 26 receives another of the voltage phase signal B with a third portion 28 receiving the remaining voltage phase signal C. Each of the three portions 24, 26 and 28 also receives the neutral N and fully rectifies the voltage phase signal with respect to N through a bridge full wave rectifier.

For the portion 24, the bridge is the diodes CR2, CR3, CR4 and CR5. For the second portion 26, the diodes are CR6, CR7, CR8 and CR9. For the third portion 28, the diodes are CR10, CR11, CR12 and CR13. The output of each of the portions 24, 26 and 28 at the nodes 30, 32 and 34 are the full wave rectified signals A', B' and C' shown in FIG. 5(b).

The output of the first portion 24, A' at the node 30 is supplied to a first comparator U6. The output of the second portion 26, B', at the output node 32 is also supplied to the first comparator U6 as the other input thereof. Similarly, the outputs from the nodes 32 and 34 are supplied to the comparator U7. The output from the nodes 30 and 34 are supplied to the third comparator U8.

The first comparator U6 compares the absolute magnitude of the fully-rectified A' signal to the fully rectified B' signal. The result is the control signal P. The control signal P, whose wave form is shown in FIG. 5(d), is substantially zero where the absolute magnitude of the B' signal exceeds the A' signal and substantially has the voltage $+V$ where the absolute magnitude of the A' signal exceeds the B' signal. Similarly, the output of the second comparator U7 is the control signal Q whose wave form is shown in FIG. 5(e). The second comparator U7 compares the absolute magnitude of the signal B' to the signal C'. Finally, the output of the third comparator U8 is the control signal R. The third comparator U8 compares the absolute magnitude of the signal C' to the absolute magnitude of the signal A'. The wave forms for the control signals R is shown in FIG. 5(f).

Figure 3:
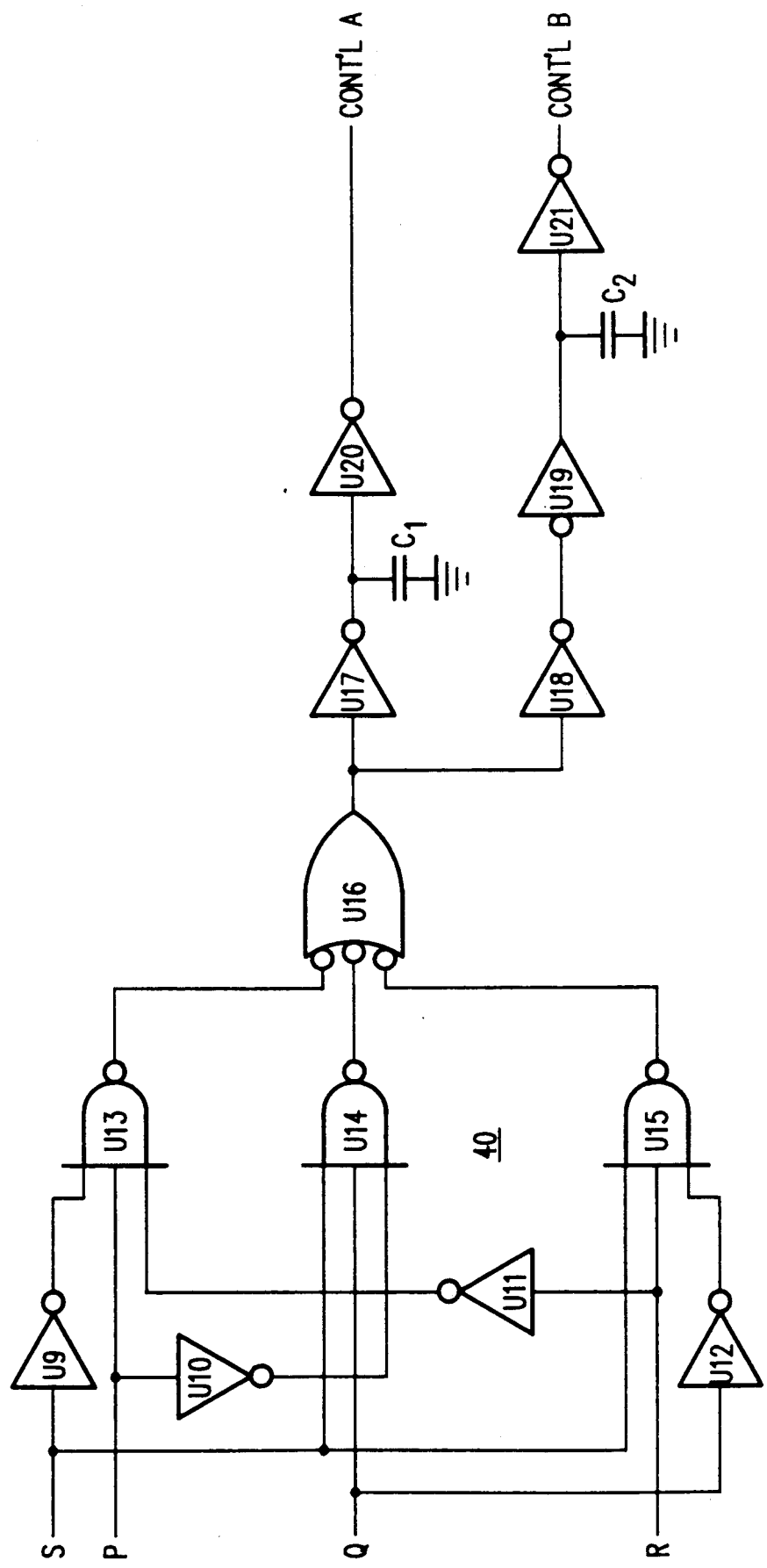
FIG. 3 is another diagram of a portion of the control circuit of the apparatus of the present invention using the output signals of the circuits shown in FIG. 2 to generate the first and second control signals.

The control signals S, P, Q and R are supplied to a logic circuit 40 shown in FIG. 3. The S signal is inverted by invertor U9 and is supplied to a NAND gate U13. The other inputs to the NAND gate U13 are the control signals P and $\overline{R}$. Similarly, the control signals S, $\overline{P}$ and Q are supplied as inputs to the NAND gate U14. Finally, the inputs to the NAND gate U15 are S, $\overline{Q}$, and R. The output of the NAND gates U13, U14 and U15 has a wave form as shown in FIG. 5(g-i) respectively. These outputs are then supplied to an inverted input or gate U16. The output wave form of the gate U16 is shown in FIG. 5(j). The output of the gate U16 is inverted twice and becomes the control signal CONT'L A. The output of the U16 is inverted three times and becomes the CONT'L B signal. The function of the capacitors $C_1$ and $C_2$ will be discussed hereinafter. The wave forms are shown in FIG. 5(k) and (l), respectively. U20 and U21 are inverting buffers (drivers) which are used to drive the opto-isolators in FIG. 4.

As can be seen from FIG. 5 waveform, CONT'L A switches substantially every 60°. The switching is in phase with the commencement of a cycle of the A phase (this is because the voltage phase signal A was used to generate the S signal). The CONT'L A signal, thus, is an oscillating signal that oscillates every 60° between 0 volts and $+V$ voltage. The signal CONT'L B is 60° out of phase with the signal CONT'L A and oscillates between $+V$ and 0 volts. When CONT'L A is at 0 volts CONT'L B is at $+V$ whereas when CONT'L A is at $+V$ volts CONT'L B is at 0 volts.

Figure 4:
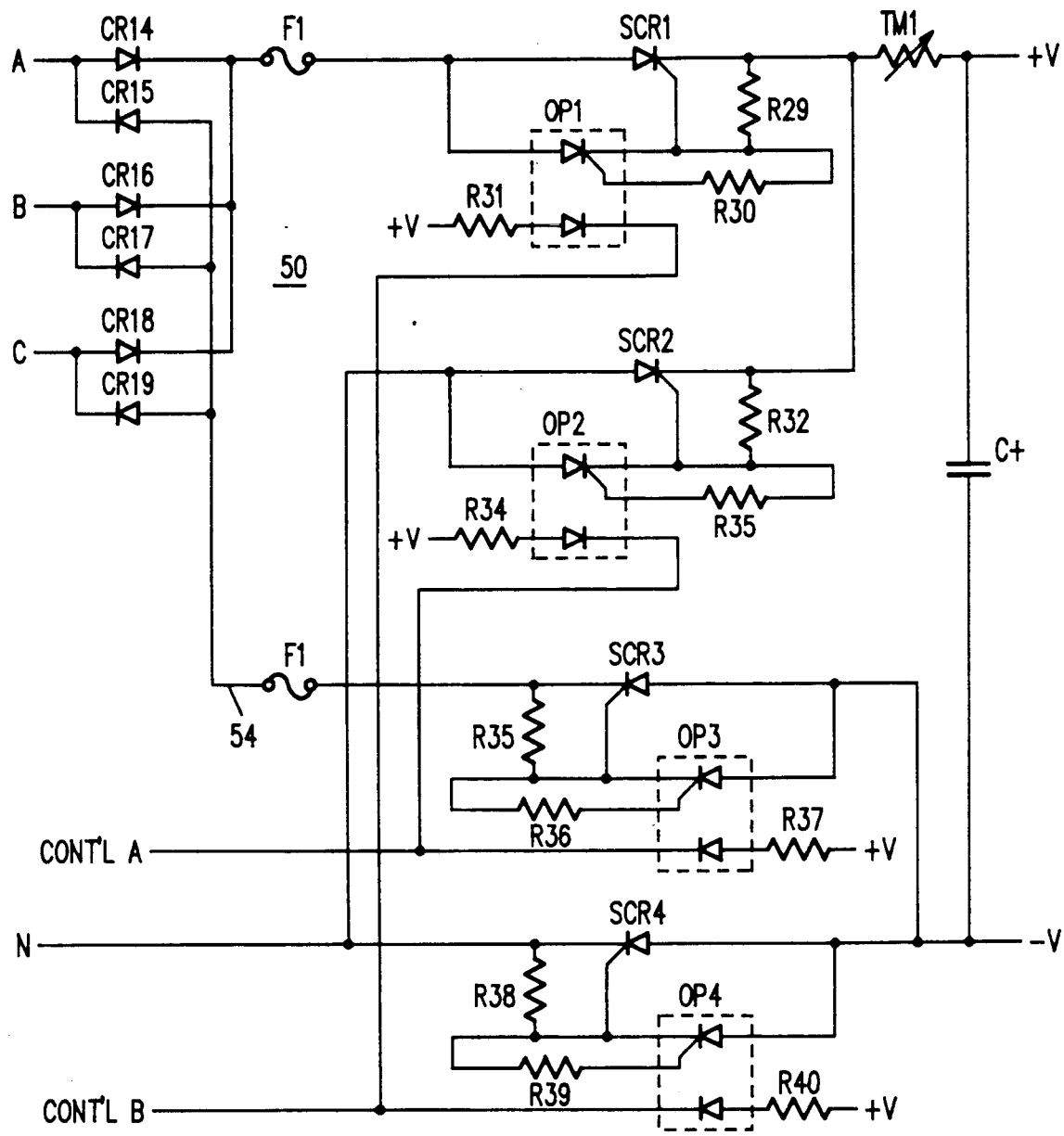
FIG. 4 is the rectification circuit portion of the apparatus of the present invention showing the three-phase AC signal and neutral, and the control signals used to generate the full wave rectified signal.
Figure 5:
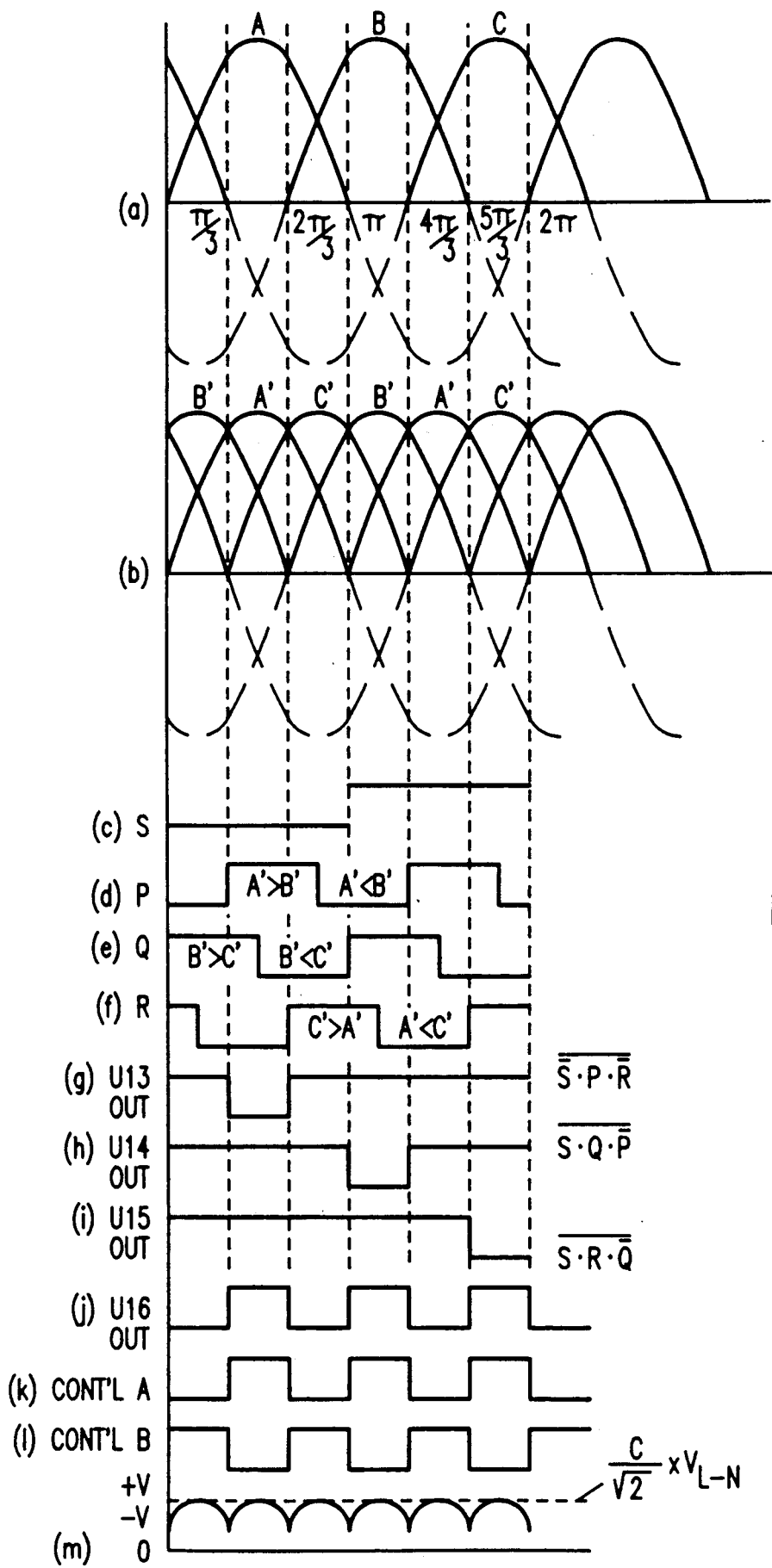
FIG. 5 (a-m) are wave forms developed or used in various parts of the apparatus of the present invention.
Figure 1:
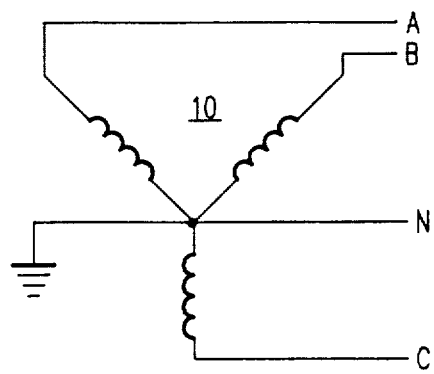
Figure 2:
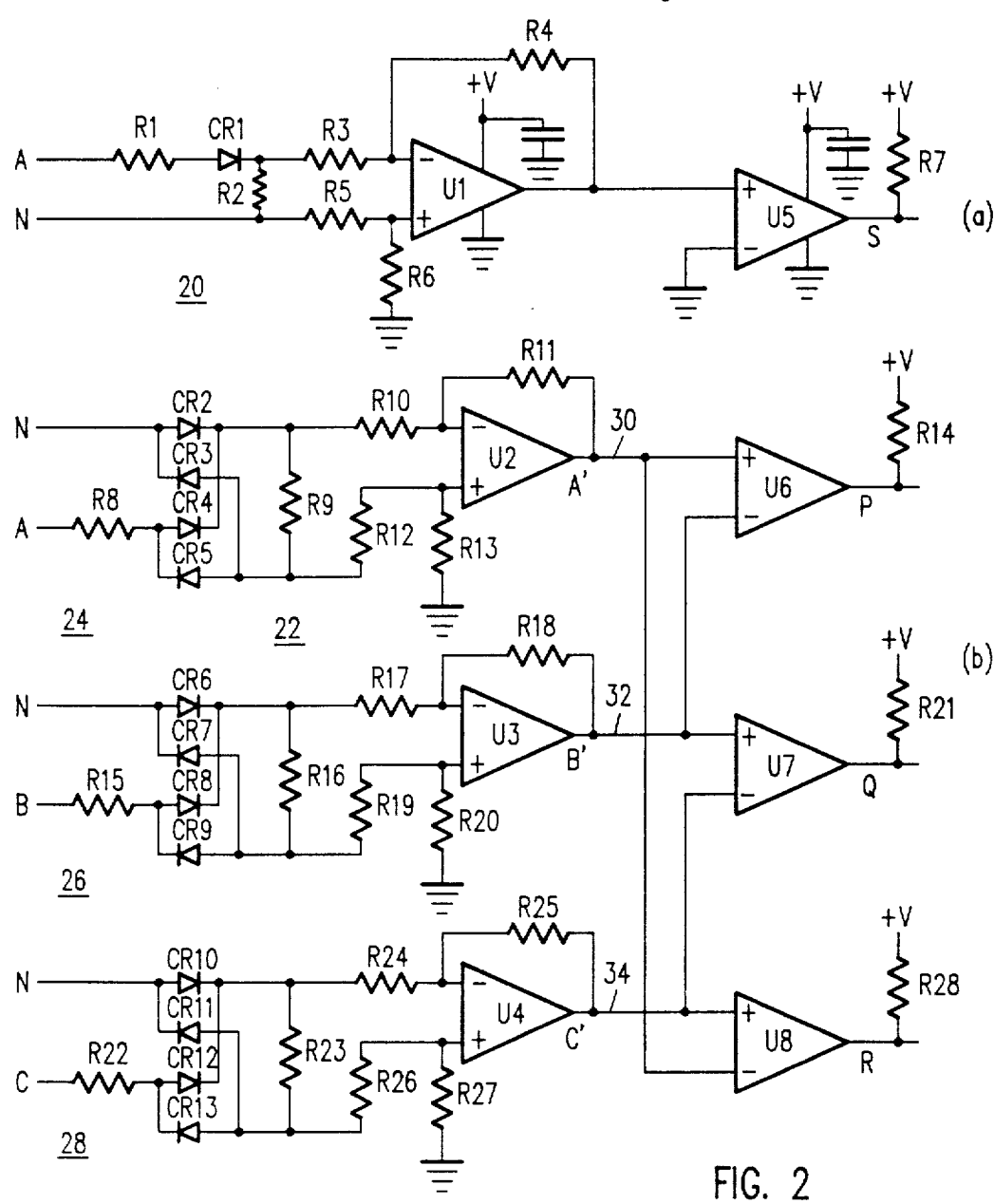
Figure 4:
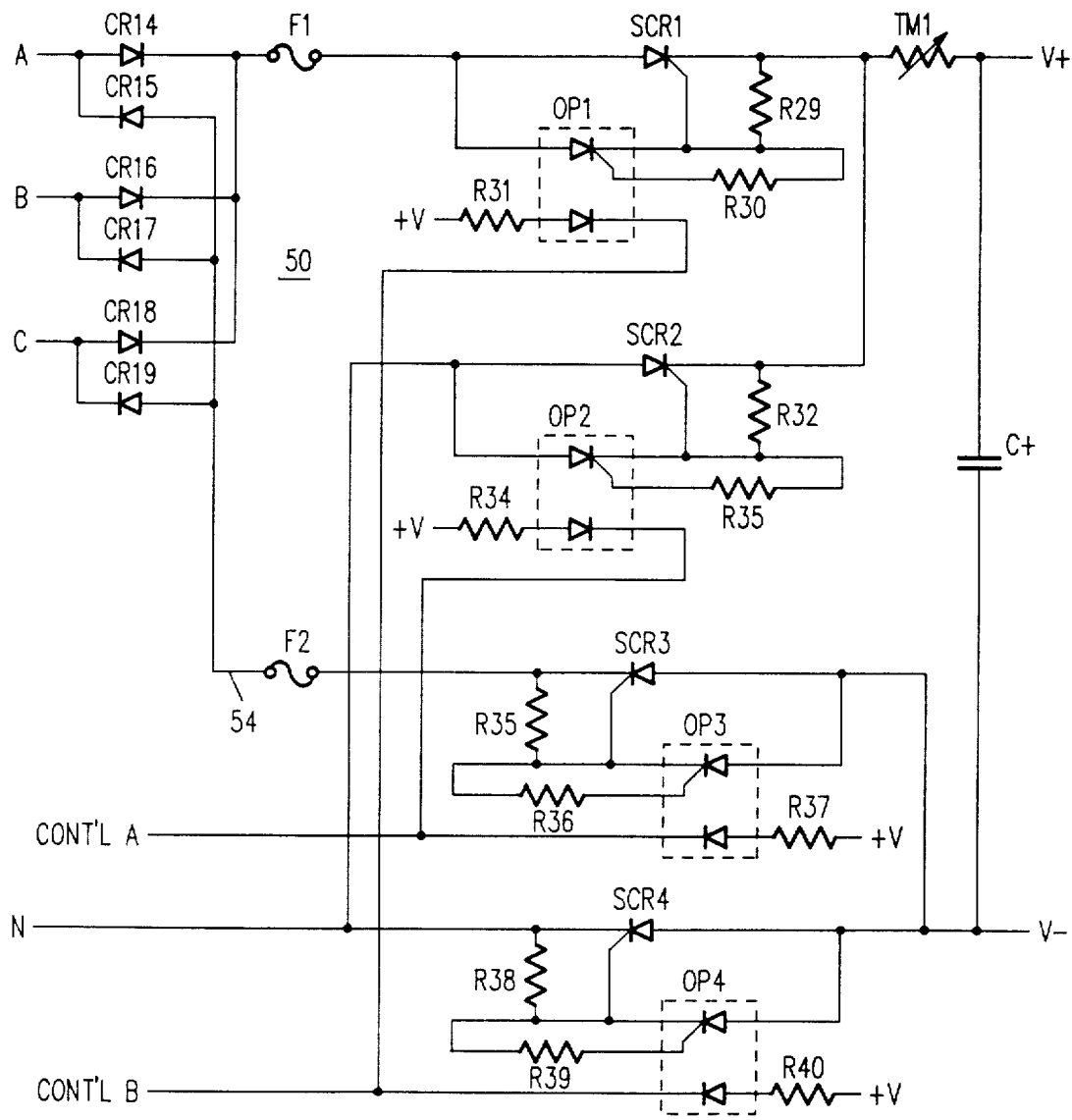
Figure 5:
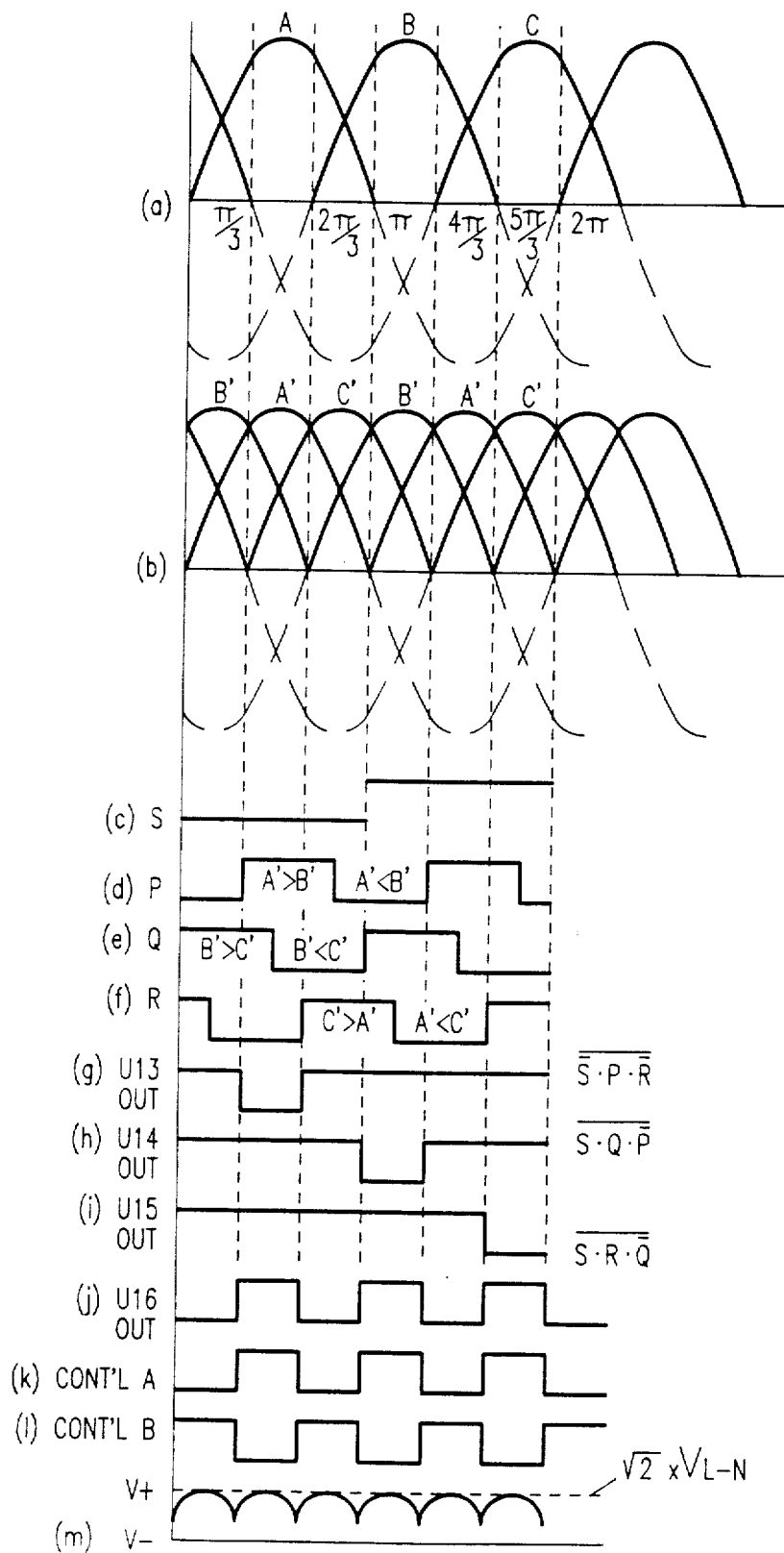

Referring to FIG. 4 there is shown a schematic drawing of the rectification circuit 50 portion of the apparatus of the present invention. Each of the three-phase signals A, B, and C is supplied through a diode CR14, CR16 and CR18 respectively in a forward conduction manner and are connected to a common first node 52.

From the first node 52, the signal travels through a fuse F and through SCR switch SCR1. The signal path then passes through TM1 which is a NTC thermistor which provides a "soft-start" to prevent sudden surges in current. The signal path is then supplied to the node $V_+$ and through a capacitor C. The capacitor C is used to eliminate the "ripples" in a full wave rectifier. The return path is from the node $V_-$ through an SCR switch SCR4 to the neutral line N.

The negative phase of the cycle of the input phase signals A, B and C are supplied to the diodes CR15, CR17 and CR19, which are connected in opposite polarity to the diodes CR14, CR16, and CR18. Through the negative phase, the phase signals A, B and C are supplied to the second node 54. From the second node 54, the signal path goes through a fuse $F_2$ and through the SCR switch SCR3. From the SCR switch SCR3, the signal passes through $V_-$ through the capacitor C and to the node $V_+$. From the node $V_+$, the signal passes through the SCR switch SCR2 and back to the neutral N.

Each of the SCR switches SCR1, SCR2, SCR3, and SCR4 is regulated by an opto-isolated driver OP1, OP2, OP3 and OP4 respectively. The opto-isolated drivers OP1 and OP4 are switched in tandem and are connected to the control signal CONT'L B. The opto-isolated drivers OP2 and OP3 are connected together and are switched in tandem and are connected to the signal CONT'L A.

In the operation of the rectification circuit 50, between the cycle 0 and $\pi/3$, CONT'L A is low and CONT'L B is high. With CONT'L A low (i.e., at ground), opto-isolated drivers OP2 and OP3 would conduct causing SCR switches SCR2 and SCR3 to turn on. At the same time, CONT'L B would be high (i.e., at $+V$), causing opto-isolated drivers OP1 and OP4 to remain off. Thus, SCR switches SCR1 and SCR4 would be off.

When SCR switches SCR2 and SCR3 are on, the signal path flows from second node 54 through second switch SCR3, through the capacitor C, through TM1, and through SCR switch SCR2, to neutral N. In this manner, the negative peak cycle portion of the B phase would be rectified.

During the next cycle of 60°, CONT'L A would be high and CONT'L B would be low. This would cause SCR switches SCR2 and SCR3 to be off and SCR switches SCR1 and SCR4 to be on. With the SCR switches SCR1 and SCR4 on, the signal path would be from the first node 52 through TM1 through the capacitor C through switch SCR4 to the neutral N. In this phase, the peak portion of the positive cycle of the A phase would be rectified.

Finally, in the third 60° phase, the switches SCR2 and SCR3 would be on and switches SCR1 and SCR4 would be off. This causes a conduction path from the second node 54 through switch SCR3 through the capacitor C through TM1 and through switch SCR2 to the neutral N. During this 60°, the peak negative cycle of the C phase would be rectified. The resultant waveform is shown in FIG. 5(m) excluding the effect of the capacitor C. With the capacitor C, the waveform would be substantially constant at the $V_+$.

In the preferred embodiment of the present invention, the apparatus 10 of the present invention may be practiced with circuit elements having the following values:

| | |
|---|---|
| Resistor R1 = | 15.6 kΩ |
| Resistor R2 = | 1.0 kΩ |
| Resistor R3, R4, R5, R6 = | 23.7 kΩ |
| Resistor R7 = | 5.1 kΩ |
| Diodes CR1–CR13 = | IN4007 |
| Resistors R8, R15, and R22 = | 15.6 kΩ |
| Resistors R9, R16, and R23 = | 1.0 kΩ |
| Resistors R10–R13, R17–R20, and R24–R27 = | 23.7 kΩ |
| Resistors R14, R21, and R28 = | 5.1 kΩ |
| Amplifiers U1, U2, U3, and U4 = | LM 324 |
| Comparators U5, U6, U7, and U8 = | LM 339 |
| Invertors U9, U10, U11, U12, U17, U18, U19 = | CD4049UB |
| NAND gates U13, U14, U15 and U16 = | CD4023B |
| Inverted Buffers U20 and U21 = | ULN 2004A |
| Diode Bridges CR14–CR19 = | S7006-1 |
| Opto-isolated drivers OP1, OP2, OP3 and OP4 = | MOC3001 |
| Load resistors R31, R34, R37, and R40 = | 1.0 kΩ |
| SCR switches SCR1–SCR4 = | S4060D |
| Resistors R29, R32, R35 and R38 = | 47 Ω |
| Resistors R30, R33, R36 and R39 = | 56 kΩ |

Capacitors C1 and C2 are used to adjust switching off time of the SCR switches in case they are needed There are many advantages to the method and apparatus of the present invention. The rectifying circuit of the present invention can provide full wavè rectification from a three-phase signal to a neutral having high input voltage on the order of 380 volts or 415 volts, without the need for a transformer.

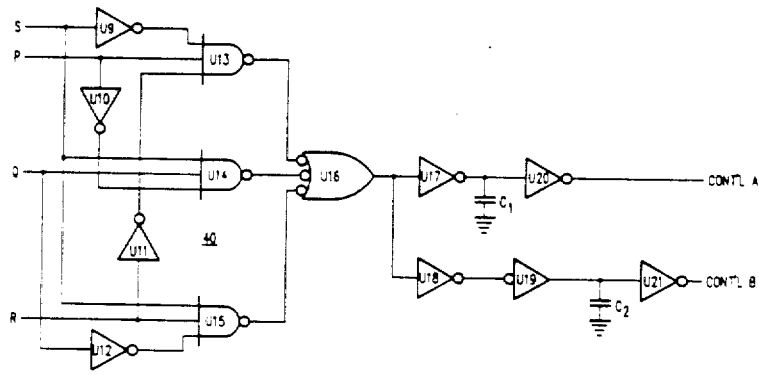

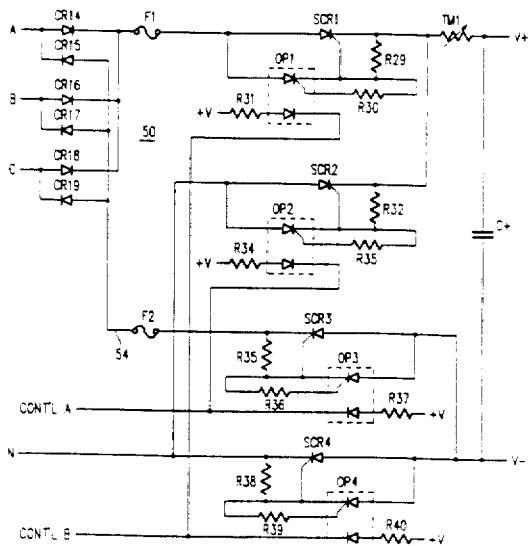

What is claimed is:

1. A full wave rectifier for use with a multi-phase signal each phase being an alternating current signal with respect to a neutral, said rectifier comprising:

means for receiving said neutral and said multi-phase signal and for generating a first control signal oscillating between a first voltage and a second voltage and a second control signal oscillating between said first voltage and said second voltage out of phase with respect to the first control signal, in response thereto; and means for rectifying each phase of said multi-phase signal based upon said first and second control signals.

2. The rectifier of claim 1 wherein said multi-phase signal comprises three phases, each being substantially 120° out of phase with another.

3. The rectifier of claim 2 wherein said first control signal oscillates substantially every 60°.

4. A full wave rectifier for use with a three-phase (hereinafter referred to as: first phase, second phase and third phase) signal operating in a wye configuration, each of said three-phase signal is an A.C. signal with respect to a neutral, alternating in a full cycle, substantially one-hundred twenty degrees out of phase with another, said rectifier comprising:

means for generating a first control signal, said first control signal oscillating substantially every sixty degrees;

means for generating a second control signal, said second control signal, having the same polarity of oscillation as said first control signal, but out of phase with respect thereto; and means for rectifying each of said three-phase signal based upon said first and second control signals.

5. The rectifier of claim 4 wherein said means for generating said first control signal further comprising:

means for generating a phase control signal based upon one of said three-phase signals;

means for comparing the absolute magnitude of said first phase signal to the absolute magnitude of said second phase signal to generate a first signal;

means for comparing the absolute magnitude of said second phase signal to the absolute magnitude of said third phase signal to generate a second signal;

means for comparing the absolute magnitude of said third phase signal to the absolute magnitude of said first phase signal to generate a third signal;

logic means for combining said first signal, said second signal, said third signal and said phase control signal to produce said first control signal.

6. The rectifier of claim 5 wherein said means for generating said second control signal further comprises:

invertor means for receiving said first control signal and for generating said second control signal in response thereto.

7. The rectifier of claim 4 wherein said means for rectifying comprises:

a first node;

a first set of diode means;

each of said three-phase signal is connected to said first node through a diode means of said first set for passing said three-phase signal in one polarity;

a second node;

a second set of diode means;

each of said three-phase signal is connected to said second node through a diode means of said second set for passing said three-phase signal in a polarity opposite said one polarity;

a first signal path from said first node to said neutral;

a second signal path from said second node to said neutral;

a first switch means positioned in said first signal path;

a second switch means positioned in said first signal path;

said first and second switch means switched in tandem and is responsive to said first control signal being in one polarity;

a third switch means positioned in said second signal path;

a fourth switch means positioned in said second signal path; and a third and fourth switch means switched in tandem and is responsive to said second control signal being in said one polarity.

8. The rectifier of claim 7 wherein each of said first, second, third and fourth switch means is an SCR switch controlled by an opto-isolated driver.

9. A method of rectifying a three-phase signal operating in a wye configuration, each of said three-phase signal is an A.C. signal with respect to a common neutral alternating in a full cycle, substantially one hundred twenty degrees out of phase with another, said method comprising:

generating a first control signal, said first control signal oscillating substantially every sixty degrees, with the oscillation in phase with the commencement of a full cycle of one of the three-phase signal;

generating a second control signal, said second control signal oscillating out of phase with said first control signal;

rectifying said three-phase signal in response to said first and second control signals.

* * * * *

UNITED STATES PATENT AND TRADEMARK OFFICE
CERTIFICATE OF CORRECTION

PATENT NO. : 5,051,883

DATED : September 24, 1991

INVENTOR(S) : Chin Y. Cheng

It is certified that error appears in the above-indentified patent and that said Letters Patent is hereby corrected as shown below:

The title page, showing the illustrative figures, should be deleted and substitute therefor the attached title page.

Figure 2:
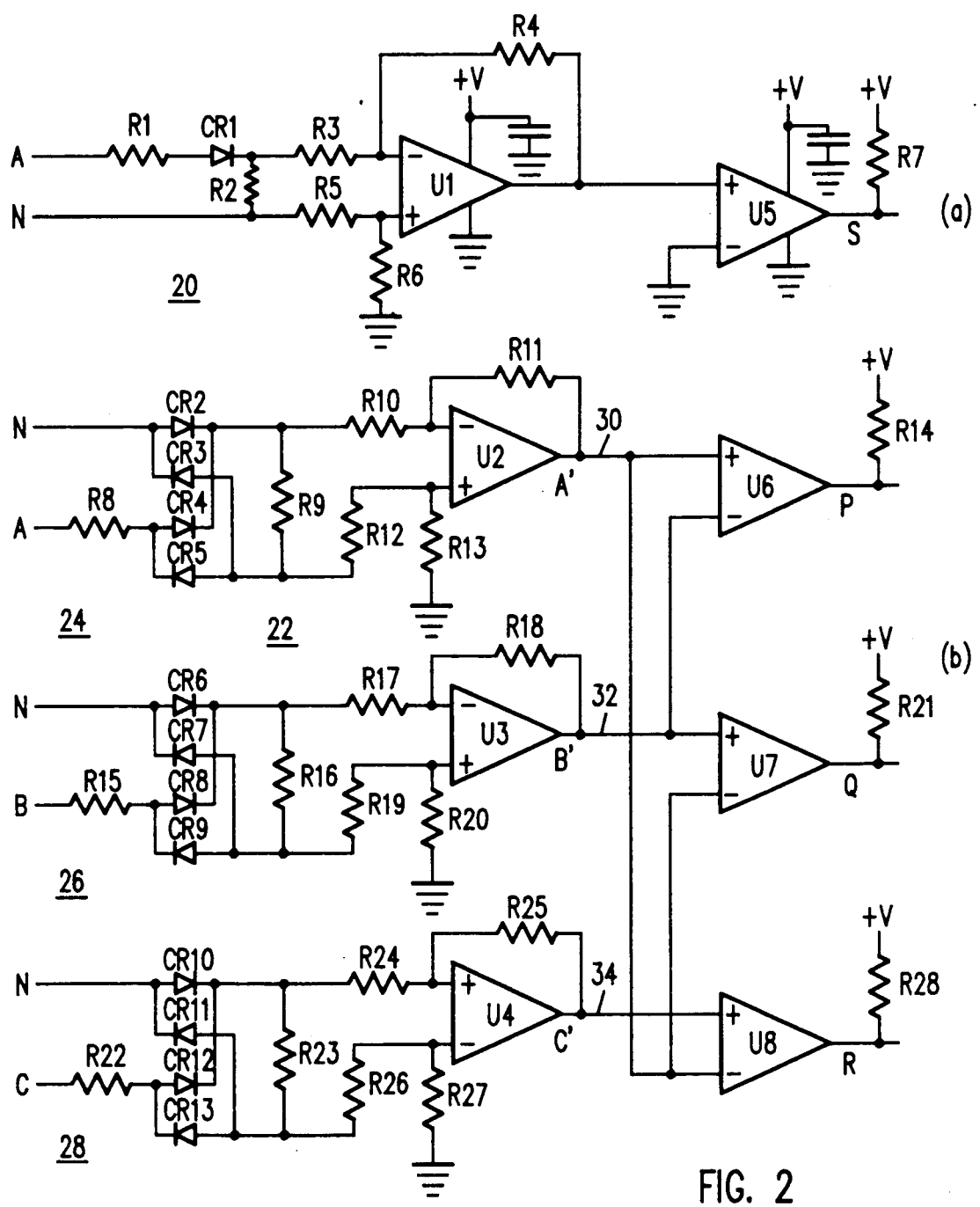
FIG. 2 (a and b) are circuit diagrams of the control circuit portion of the apparatus of the present invention showing the generation of the control signals used in the rectification of the three-phase AC signal.

In the Drawings:

Figs. 2, 4, and 5, should be deleted and substitute therefor the attached Figs. 2, 4, and 5.

Signed and Sealed this

Second Day of November, 1993

Attest:

BRUCE LEHMAN

Attesting Officer

Commissioner of Patents and Trademarks

United States Patent [19]

Cheng

[11] Patent Number: 5,051,883
[45] Date of Patent: Sep. 24, 1991

[54] METHOD AND AN APPARATUS FOR FULL WAVE RECTIFICATION OF A THREE-PHASE SIGNAL OPERATING IN A WYE CONFIGURATION

[76] Inventor: Chin Y. Cheng, 10451 Scenic Cir., Cupertino, Calif. 95014

[21] Appl. No.: 557,908

[22] Filed: Jul. 25, 1990

[51] Int. Cl.⁵ .......................................... H02M 7/145
[52] U.S. Cl. ...................................... 363/89; 363/87; 363/129
[58] Field of Search ...................... 363/85, 87, 88, 89, 363/126–129; 323/299

[56] References Cited

U.S. PATENT DOCUMENTS 4,156,896  5/1979  Weiss ................................. 363/87
4,309,749  1/1982  Weibelzahl et al. ................. 363/87
4,672,526  6/1987  Mehnert et al. ................... 363/87 X
4,924,371  5/1990  Peterson ............................ 363/89

Primary Examiner—Steven L. Stephan
Assistant Examiner—Emanuel Todd Voeltz
Attorney, Agent, or Firm—Limbach, Limbach & Sutton

[57] ABSTRACT

A full wave rectification circuit for use with a three-phase input signal connected in a wye configuration for rectifying a line to neutral high input voltage is disclosed. The rectification circuit has two portions. A first portion generates a control signal which oscillates every 60° and is switched in phase with one of the input signals. A second control signal, also oscillating in 60°, but completely out of phase with respect to the first oscillating signal is also generated. The two oscillating signals are used in a SCR switch configuration to switch the rectification circuit every 60° thereby rectifying the peak voltage portion of each phase.

9 Claims, 4 Drawing Sheets